Oct. 27, 1964   M. R. SOMMERIA   3,154,719
ARC STARTING SYSTEM
Filed Sept. 11, 1961   2 Sheets-Sheet 1

INVENTOR.
MARCEL R. SOMMERIA
BY Mueller & Aichele
ATTYS.

Oct. 27, 1964  M. R. SOMMERIA  3,154,719
ARC STARTING SYSTEM
Filed Sept. 11, 1961  2 Sheets-Sheet 2

INVENTOR.
MARCEL R. SOMMERIA
BY Mueller & Aichele
ATTYS.

United States Patent Office 3,154,719
Patented Oct. 27, 1964

3,154,719
ARC STARTING SYSTEM
Marcel R. Sommeria, Palos Heights, Ill., assignor to Welding Research Inc., Chicago, Ill., a corporation of Illinois
Filed Sept. 11, 1961, Ser. No. 137,273
10 Claims. (Cl. 315—163)

This invention relates generally to welding systems and more particularly to a system for initiating an arc between an electrode and a workpiece at a predetermined instant without contact therebetween.

In many welding processes, such as for spot welding, it is important that the duration of the welding arc be precisely controlled. This has been difficult to accomplish because it has not been possible to start an arc at a precise instant. Inasmuch as one electrode forming the arc is the work itself, there may be slight irregularities therein which cause variations in the length of the arc, or other conditions which affect the instant of firing in response to a firing voltage. Although the arc may be positively established by moving the electrode into contact with the workpiece, this is undesirable as it contaminates the workpiece. Also, this requires a mechanical movement each time the arc is established which complicates the equipment. Other proposed systems have not been satisfactory or have been unduly complex.

It is therefore an object of the present invention to provide a simple arc starting circuit for a welding system.

Another object of the invention is to provide an arc starting arrangement for a welding system wherein there is no mechanical movement.

A further object of the invention is to provide an arc starting system wherein the time of starting is extremely accurate and the overall equipment is relatively simple.

A feature of the invention is the provision of a circuit for starting an arc wherein a pulse of voltage is applied to a spark gap coupled to the arc for initiating the arc and for applying current thereto through the spark gap.

Another feature of the invention is the provision of an arc starting circuit wherein a voltage pulse is produced in an inductor by discharge of a condenser, with the voltage pulse being stepped up and applied to a spark gap. The pulse breaks down the spark gap so that current is applied therethrough to the arc to heat the same, and the arc is then fed from current supplied by the main welding current source. In order to provide the right polarity at the welding electrode, a rectifier may be connected in the high voltage pulse circuit to block the pulse resulting from increase in current through the inductor and to pass the pulse resulting from decrease in current through the inductor.

A still further feature of the invention is the provision of an arc starting circuit including controlled rectifiers for providing a prefiring current, and an opposing current to produce a voltage pulse which breaks down a spark gap and ignites the welding arc to fire the same. The rectifiers may be silicon controlled rectifiers or other types.

The invention is illustrated in the accompanying drawings wherein.

Figure 4:
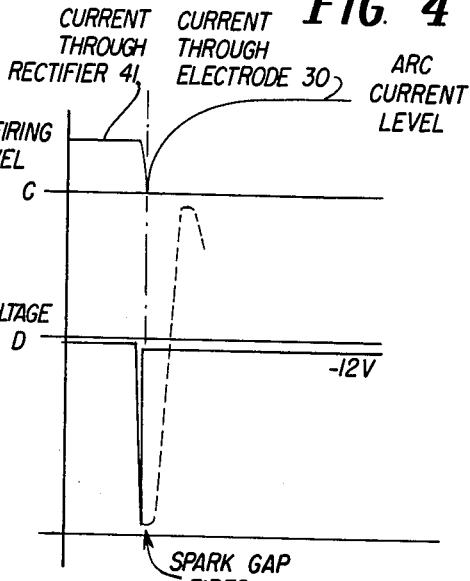
Figure 3:
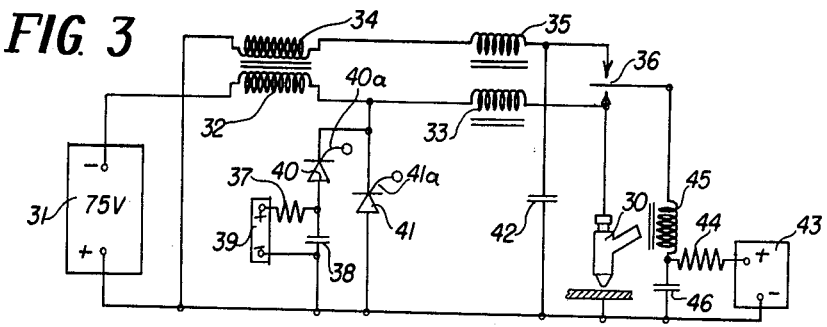
FIG. 3 shows a second embodiment of the circuit of the invention.
Figure 5:
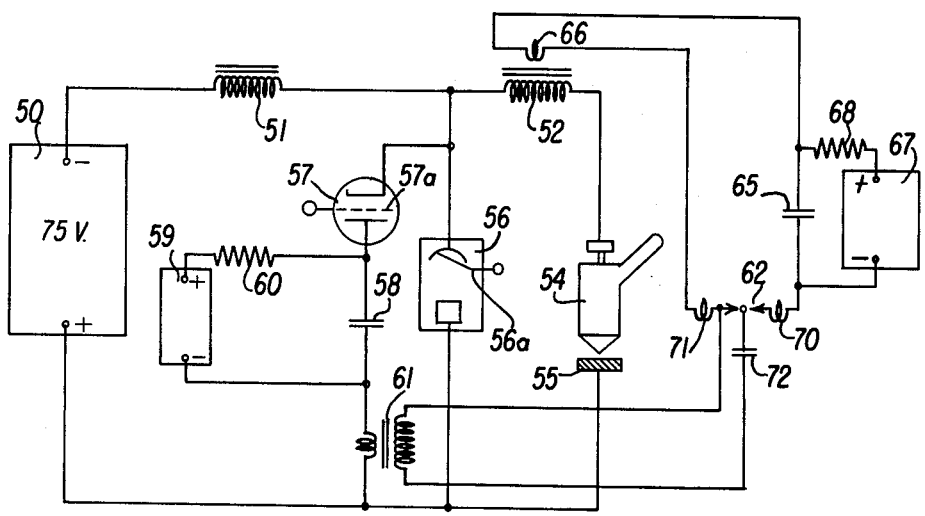
Figure 6:
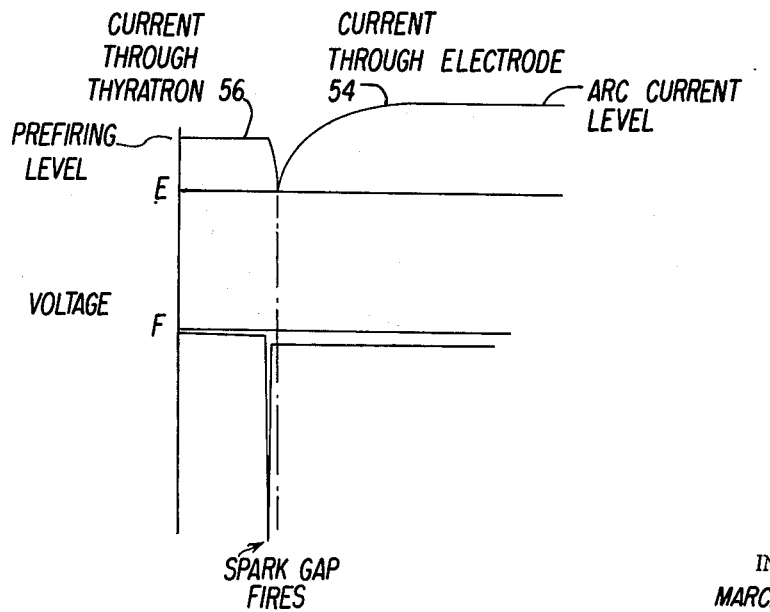

FIG. 4 includes curves showing the operation of the circuit of FIG. 3;

FIG. 5 shows a further embodiment of an arc starting circuit of the invention; and FIG. 6 includes curves which show the operation of the circuit of FIG. 5.

In practicing the invention an electrode for welding is connected to a current source for providing the welding current. The source has a low voltage which is inadequate to fire the arc. In series with the source there is provided an inductor in which a voltage pulse is produced. The voltage pulse may be provided by charging of a condenser and discharging the same under control of a thyratron tube or a silicon controlled rectifier. The voltage pulse is applied through a transformer to a circuit which includes a spark gap and the welding electrode. One terminal of the spark gap is connected to a second source of current, and when the voltage pulse causes a discharge across the spark gap, this current is applied to the welding electrode. Accordingly, the voltage pulse breaks down the spark gap and fires the arc at the electrode with current being applied through the gap to the arc to heat the same. This conditions the arc for operation from the main low voltage welding current source which applies current to the arc for a predetermined time after the starting pulse has ceased. In a circuit configuration wherein the voltage which is produced as current builds up in the starting inductor is of the wrong polarity, a rectifier may be connected in series so that this voltage is blocked. In such case the pulse of opposite polarity, produced when the current through the inductor decreases, will be passed by the rectifier to provide the starting action.

The starting circuit may include a controlled rectifier for producing a prefiring current and a second rectifier for providing an opposing current so that a voltage pulse is developed in the inductor when the current is blocked. In such a circuit the initial voltage pulse is of the right polarity so that the high voltage rectifier is not required. The pulse is used to fire a spark gap which applies current to the arc to initiate firing. The spark gap may apply a pulse which is added to the pulse in the inductor to provide a very hot spark at the welding electrode.

Figure 1:
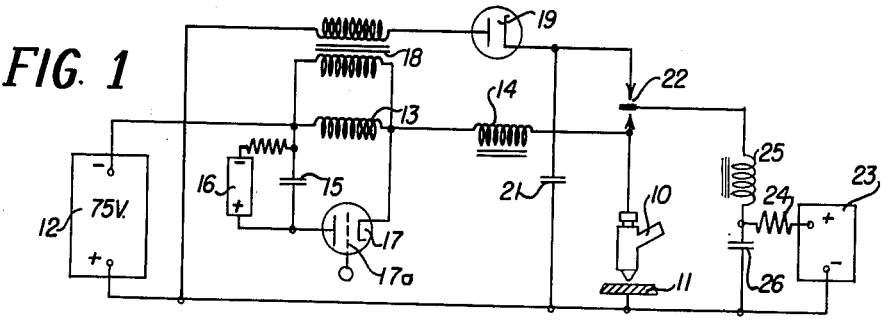
FIG. 1 illustrates an arc starting circuit in accordance with the invention.
Figure 2:
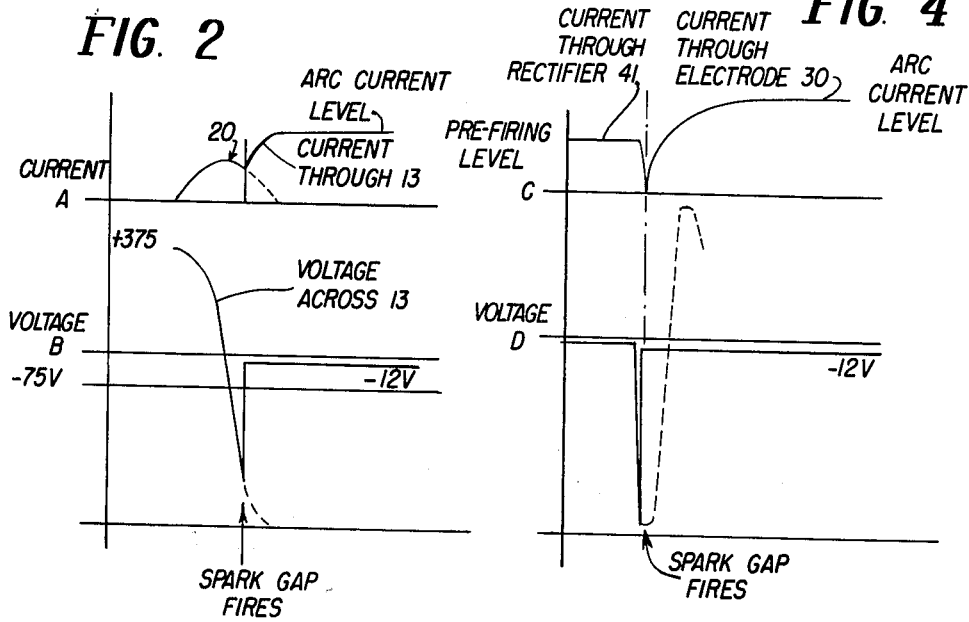
FIG. 2 is a chart with curves showing operation of the circuit of FIG. 1.

Reference is now made to FIG. 1 wherein the welding electrode of welding gun 10 is shown spaced from a workpiece 11. The welding electrode is connected to a welding current source 12 through inductor 13 and choke 14. The source 12 may have a voltage such as 75 volts which is not adequate to break down the arc to cause firing. Bridged across inductor 13 is a capacitor 15 connected in series with a thyratron tube 17. The capacitor 15 is normally charged by the source 16. The thyratron tube 17 fires when a pulse is applied to its control electrode 17a, and the voltage across capacitor 15 is applied to inductor 13. This causes a current to rise therein as shown by curve A in FIG. 2. The voltage pulse across inductor 13 is applied through transformer 18 to diode 19. The diode is of a polarity to block the voltage in transformer 18 as the current increase in coil 13, as shown in FIG. 2. However, as the current in inductor 13 starts to fall (point 20 on curve A) a pulse of the opposite polarity will be developed thereacross and this pulse will be of the polarity to be conducted through diode 19 and developed across capacitor 21.

A three terminal spark gap 22 is connected in series with the welding electrode 10 across capacitor 21. The voltage developed across capacitor 21 will produce a discharge across the spark gap 22 and will also fire an arc between the welding electrode 10 and the workpiece 11. When the spark gap 22 conducts, current from capacitor 26, previously charged by source 23 through resistor 24, is applied through choke 25 and through the spark gap to the welding electrode of welding gun 10 to continue the arc. The arc between the electrode of gun 10 and work piece 11 will thereby be established so that current from the low voltage source 12, which flows through inductor 13 and choke 14, will cause the arc to continue after the gap 22 ceases to conduct. The chokes 14 and 25, which are wound on cores of ferrite magnetic material, are required so that the initial pulse through the spark gap will not be passed thereby and be diverted from the welding electrode 10.

Curve A shows the current through the inductor 13 which, as previously stated, drops at point 20 until the arc is established. Then the current from source 12, which provides the main welding current, will be passed therethrough and provide the desired current level. The voltage across inductor 13 is shown by curve B of FIG. 2, with this voltage being of the order of 375 volts positive when the current builds up in the inductor. The voltage reverses and reaches a value of more than 300 volts negative as the current in the inductor 13 reduces. When the voltage reaches the level to fire the spark gap 22, the voltage across inductor 13 will drop from the −75 volt open circuit level to the level resulting from current flow from the source 12 into the welding arc.

In FIG. 3 there is shown another embodiment of the invention. Current is supplied to the welding electrode 30 from the low voltage source 31 through inductor 32 and choke 33. The choke 33 is wound on a ferrite core. This part of circuit is exactly the same as in FIG. 1. Silicon controlled rectifier 41 is connected to complete a circuit from source 31 through inductor 32. Capacitor 38 is connected by silicon controlled rectifier 40 across rectifier 41 to produce an opposing current. Capacitor 38 is charged from source 39 through resistor 37. Inductor 32 is coupled to inductor 34 as a transformer.

At a convenient time prior to arc ignition time, silicon controlled rectifier 41 is triggered to conduct current from source 31 through inductor 32. This current is shown as the prefiring level on curve C of FIG. 4. At the desired arc ignition time, the rectifier 40 is triggered to conduct, and the voltage across capacitor 38 produces a current which counteracts and nullifies the current through rectifier 41. This causes the silicon controlled rectifier 41 to be cut off and in condition for a further operation. The interruption of current in inductor 32 creates a voltage pulse which is the front end of the voltage transient shown in dotted line of curve D in FIG. 4 (bottom). At the same time the voltage pulse in inductor 32 appears at higher level in winding 34 and is applied through choke 35 to capacitor 42.

As stated above the left part of curve C of FIG. 4 shows the prefiring current which flows from source 31 through the controlled rectifier 41. The right hand part shows the current through the welding electrode 30 after the arc is established. The current through rectifier 41 is blocked when the rectifier 40 fires to provide a voltage pulse across inductor 32, which is shown in curve D. The voltage pulse in winding 34 is of the desired polarity so that it is not necessary to provide a rectifier in the high voltage circuit. The voltage pulse causes a discharge across the spark gap 36 in the manner previously described, and also fires the arc at the electrode of the welding gun 30. Additional transient current is supplied to this arc through the center contact of the spark gap from capacitor 46 through choke 45, with capacitor 46 being previously charged through resistor 44 by source 43. This causes the arc to be fully established so that current from the low voltage source 31 will cause the arc to continue. As stated above, this is shown by the right part of curve C, FIG. 4.

In the circuit of FIG. 3, a control voltage is applied to the control electrode 41a of the silicon controlled rectifier 41, prior to the desired instant of starting of the welding arc. This starts the pre-firing current required for operation of the circuit. At the instant that the welding arc is to be started, a similar control voltage is applied to the control electrode 40a of the silicon controlled rectifier 40 to actually start the welding arc. These control voltages can be provided in various known ways.

A further embodiment of the invention is shown in FIG. 5. In this circuit the welding source 50 is connected through inductor 51 and winding 52 to the welding gun 54. To initiate starting of the arc between the electrode of the welding gun 54 and the work piece 55, the ignitron tube 56 is first triggered to complete a circuit providing a prefiring current from the source 50 through the inductor 51. This is actuated by applying a voltage pulse to the control electrode 56a of the ignitron 56. At the instant when firing is desired, current is applied in the opposite direction to block the original current flow, as in the circuit of FIG. 3. This is accomplished by thyratron tube 57 which is connected in series with capacitor 58. The capacitor 58 is charged from source 59 through resistor 60 so that when the thyratron 57 fires, the charged capacitor 58 provides current flow opposing the pre-firing current flowing through ignitron 56 shutting it off so that it is available for the next operation, while producing the voltage transient in inductor 51 contributing to the ignition of the arc. The thyratron tube is fired by the application of a control voltage to its control grid 57a.

Also connected in the series circuit including the capacitor 58 is a transformer 61. When the thyratron tube 57 fires, the voltage pulse produced by current flow from the charged capacitor 58 will also appear in the transformer 61. The transformer 61 is coupled to one end electrode and the center electrode of the three electrode spark gap 62. This spark gap completes a circuit from capacitor 65 to a winding 66 coupled to the winding 52. The capacitor 65 is charged from source 67 through resistor 68. When the pulse from transformer 61 causes the spark gap 62 to fire, the voltage across capacitor 65 will be applied to winding 66 and through the transformer coupling to winding 52.

Although the pulse from transformer 61 is applied only between one end electrode and the center electrode of the spark gap 62, both sections of the spark gap will conduct because of the arresting action produced by the inductive loads on either side of the spark gap. These loads are produced by small inductors 70 and 71. The connection is made to the center electrode of the spark gap through capacitor 72 so that direct current from the capacitor 65 will not be applied to the transformer 61. Accordingly, when the spark gap fires, the voltage across capacitor 65 is applied through the spark gap to the winding 66 to produce a pulse therein. The transformer 61 and the transformer formed by winding 62 and 66 both have cores of ferrite material and thereby very high voltage can be produced in a transformer of small size.

The voltage pulse across winding 52 will be added to the voltage pulse across inductor 51 when the current flow therein is blocked, to provide a large voltage pulse at the electrode of the welding gun 54. This pulse is of sufficient magnitude that a very hot spark will be produced at the electrode to insure firing. The welding current then continues from source 50 through inductor 51 and winding 52.

The operation of the circuit of FIG. 5 is illustrated by the curves of FIG. 6, which are substantially the same as the curves of FIG. 4. Curve E shows the pre-firing current through thyratron 56 which is blocked and drops to zero to produce firing of the arc. The voltage across inductors 51 and 52 is shown by curve F and a large pulse is developed thereacross to insure firing. When the arc is established current from the source 50 flows through the arc and this is shown by the right hand part of curve E.

In accordance with the invention a circuit is provided for starting an arc at a welding electrode which is very reliable in operation. The circuit is relatively simple and requires no moving parts. Various forms have been illustrated which may be desirable in different applications.

I claim:

1. A starting system for initiating an arc at a welding electrode including in combination, a transformer having primary and secondary windings, a first circuit including said primary winding and inductor means connected in series from the welding electrode to welding current supply means, said first circuit including first rectifier means for providing prefiring current through said primary winding, a capacitor and second rectifier means connected in series to said primary winding, and means for charging said capacitor, said second rectifier means being operative to apply the voltage across said capacitor to provide current opposing said prefiring current so that a voltage pulse is produced in said primary winding, a spark gap having outer electrodes and an intermediate electrode which are interconnected when a spark discharge is produced thereacross, a second circuit connecting said outer electrodes of said spark gap and the welding electrode in series and including means for supplying current to said intermediate electrode, said second circuit including capacitor means connected to said secondary winding and to said spark gap for applying the high voltage pulse developed in said transformer to said spark gap to produce a discharge across said spark gap and an arc at the welding electrode in response to said voltage pulse, said discharge across said spark gap providing a path for current flow from said intermediate electrode to said arc at the welding electrode, with the arc established at the welding electrode completing a path for current flow from the welding current supply means through the welding electrode, said inductor means presenting high impedance to current flow through said spark gap to prevent diversion of such current flow from the welding electrode.

2. A starting system for initiating an arc at an electrode and including first and second current supply means said system including in combination, a first circuit including inductor means for connecting the electrode to the first current supply means, a second circuit including a spark gap coupling the electrode to the second current supply means, said first circuit including means coupled to said inductor means for developing a voltage pulse therein and means applying the voltage pulse to the electrode and to said spark gap to initiate arcs thereat, said spark gap applying current from the second supply means through the electrode to the arc, said inductor means presenting a high impedance to current flow from the second current supply means through said spark gap to prevent diversion of current from the electrode, with the arc established at the electrode completing a path for current flow from the first current supply means through said inductor and the electrode.

3. A starting system for initiating an arc between a welding electrode and a workpiece and including first and second current supply means, said system including in combination, a first circuit for applying welding current to the arc including inductor means connected in series with the electrode and the workpiece to the first current supply means, means coupled to said first circuit for providing current flow through said inductor means to develop a voltage pulse in said inductor means which is applied through said first circuit to the electrode to initiate an arc thereat, a second circuit including switch means coupling the second current supply means to the welding electrode to apply current between the electrode and the workpiece, said first circuit including a portion coupled to said switch means and responsive to the voltage pulse in said first circuit for operating said switch means to apply current from the second current supply means through the electrode to the arc, said inductor means presenting a high impedance to current flow from the second supply means through said switch means to prevent diversion of current from the welding electrode, with the arc established at the electrode completing a path for current flow from the first current supply means through said inductor to the electrode and the workpiece.

4. A system as recited in claim 3 wherein said switch means is a spark gap having outer electrodes and an intermediate electrode all of which are interconnected when a spark discharge is produced across said spark gap, wherein said second circuit connects the second current supply means to the welding electrode through the intermediate electrode and one outer electrode of said spark gap, and said portion of said first circuit is coupled to said outer electrodes to apply the voltage pulse thereto to produce a discharge across said spark gap, so that current from the second supply means flows across said spark gap from said intermediate electrode to said one outer electrode and to the welding electrode.

5. A system as recited in claim 4 wherein said portion of said first circuit includes a transformer having primary and secondary windings, with said primary winding being connected to said inductor means, and rectifier means and capacitor means connected in series with said secondary winding, with said capacitor means being coupled to said outer electrodes of said spark gap to produce a discharge thereacross.

6. A system as recited in claim 3 wherein said means coupled to said first circuit for providing current through said inductor means includes a capacitor and an electron device connected in series, and means for charging said capacitor, with said electron device being operative to apply the voltage across said capacitor to said inductor means to produce the voltage pulse therein.

7. A system as recited in claim 3 wherein said means coupled to said first circuit for providing current flow through said inductor means includes means for interrupting such current flow through said inductor means to produce the voltage pulse therein.

8. A starting system for initiating an arc at a welding electrode including in combination, a first circuit including inductor means for connecting the welding electrode to welding current supply means, said first circuit including first rectifier means for providing prefiring current through said inductor means and means including second rectifier means operative to provide current opposing said prefiring current so that a voltage pulse is produced in said inductor means, a spark gap having electrodes which are electrically interconnected when a spark discharge is produced thereacross, a second circuit coupling said electrodes of said spark gap to the welding electrode and connecting second current supply means to one of said electrodes of said spark gap for supplying current to the welding electrode through said electrodes of said spark gap when they are interconnected, coupling means for applying said voltage pulse from said first circuit to said second circuit to produce a discharge across said spark gap and an arc at the welding electrode, said discharge across said spark gap providing a path for current flow from said second current supply means through said spark gap to the welding electrode and the arc thereat, said inductor means presenting a high impedance to current flow from the second current supply means through said spark gap to prevent diversion of current from the welding electrode, said arc at said welding electrode completing a path for current from the welding current supply means through said inductor means and the welding electrode.

9. A system as recited in claim 8 wherein said first rectifier means is an ignitron, and said means including second rectifier means includes a capacitor which is discharged through said second rectifier means to provide the current opposing the prefiring current.

10. A starting cricuit as recited in claim 8 wherein said coupling means for applying said voltage pulse from said first circuit to said second circuit includes a transformer having a primary winding connected in series with said second recifier means and a secondary winding connected to said spark gap.

References Cited in the file of this patent

UNITED STATES PATENTS

| | | |
|---|---|---|
| 2,235,385 | Rava | Mar. 18, 1941 |
| 2,697,160 | Williams | Dec. 14, 1954 |